United States Patent
Hooper et al.

(12)

(10) Patent No.: US 6,370,022 B1
(45) Date of Patent: Apr. 9, 2002

(54) SCREWLESS COMPUTER DRIVE ASSEMBLY

(75) Inventors: Paul Hooper, El Paso, TX (US); Bryan Evans, Las Cruces, NM (US)

(73) Assignee: Gateway, Inc., N. Sioux City, SD (US)

( * ) Notice: Subject to any disclaimer, the term of this patent is extended or adjusted under 35 U.S.C. 154(b) by 0 days.

(21) Appl. No.: 09/430,992

(22) Filed: Nov. 1, 1999

Related U.S. Application Data

(60) Provisional application No. 60/143,596, filed on Jul. 13, 1999.

(51) Int. Cl.$^7$ .............................. H05K 7/14; H05K 7/10
(52) U.S. Cl. ................... 361/685; 361/683; 361/727; 312/223.2
(58) Field of Search ................... 361/684, 685, 361/724, 725, 727, 728, 747, 683; 312/332.1, 333, 233.2, 223.1; 360/98.01; 248/685, 693, 200, 205.1, 300, 309.1

(56) References Cited

U.S. PATENT DOCUMENTS

| | | | | |
|---|---|---|---|---|
| 4,688,131 A | * | 8/1987 | Noda et al. ................... 360/137 |
| 4,896,777 A | * | 1/1990 | Lewis ........................... 211/41 |
| 5,262,923 A | | 11/1993 | Batta et al. |
| 5,277,615 A | * | 1/1994 | Hastings et al. ............. 439/377 |
| 5,319,519 A | * | 6/1994 | Sheppard et al. ........... 361/685 |
| 5,332,306 A | * | 7/1994 | Babb et al. ............ 312/334.16 |
| 5,510,955 A | * | 4/1996 | Taesang ....................... 361/685 |
| 5,587,889 A | * | 12/1996 | Sacherman .................. 361/809 |
| 5,595,501 A | | 1/1997 | Ho |
| 5,599,080 A | | 2/1997 | Ho |
| 5,682,291 A | | 10/1997 | Jefferies et al. |
| 5,683,159 A | * | 11/1997 | Johnson ................... 312/334.7 |
| 5,734,557 A | | 3/1998 | Mc Anally et al. |
| 5,801,920 A | | 9/1998 | Lee |
| 5,806,949 A | | 9/1998 | Johnson |
| 5,921,644 A | * | 7/1999 | Brunel et al. ............. 312/223.2 |
| 6,025,987 A | * | 2/2000 | Allirot et al. ................ 361/685 |
| 6,094,342 A | * | 7/2000 | Dague et al. ................ 361/685 |
| 6,130,817 A | * | 10/2000 | Flotho et al. ................ 361/685 |

FOREIGN PATENT DOCUMENTS

JP          6-215553     *  8/1994    ........... G11B/33/12

* cited by examiner

Primary Examiner—Leo P. Picard
Assistant Examiner—Anatoly Vortman
(74) Attorney, Agent, or Firm—Kenneth J. Cool; Mark S. Walker

(57) ABSTRACT

A screwless computer drive assembly is provided wherein a drive mounting bracket or computer chassis is equipped with lock sliders which, when engaged, compress flexible, flanged tabs into corresponding holes located on the computer drive. The lock sliders slide along the outside of the drive mounting bracket causing the flexible tabs to flex inward resulting in the ends of the tabs engaging the holes. Once the tabs have engaged the holes in the drive, the drive is securely held in place.

6 Claims, 9 Drawing Sheets

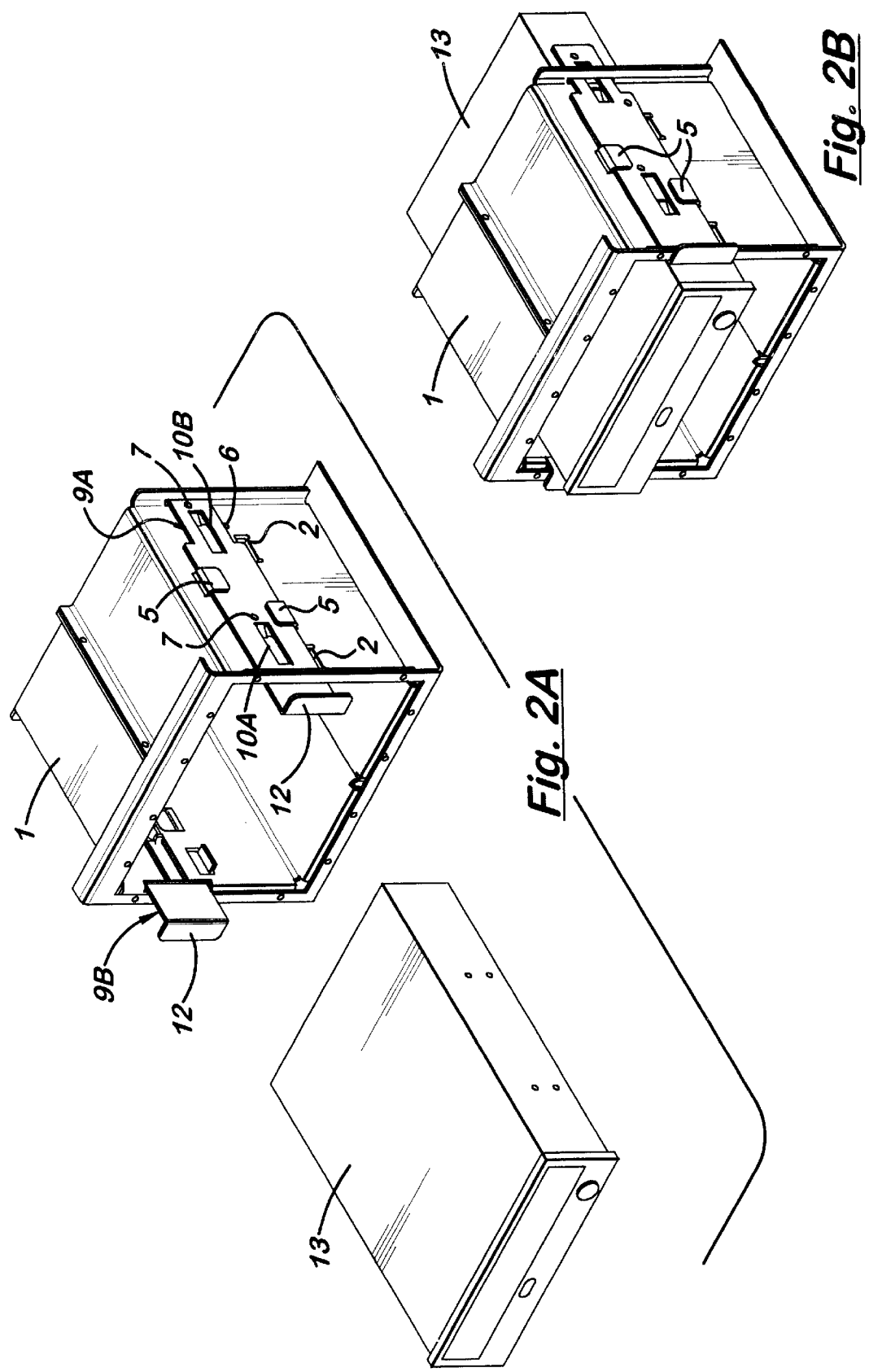

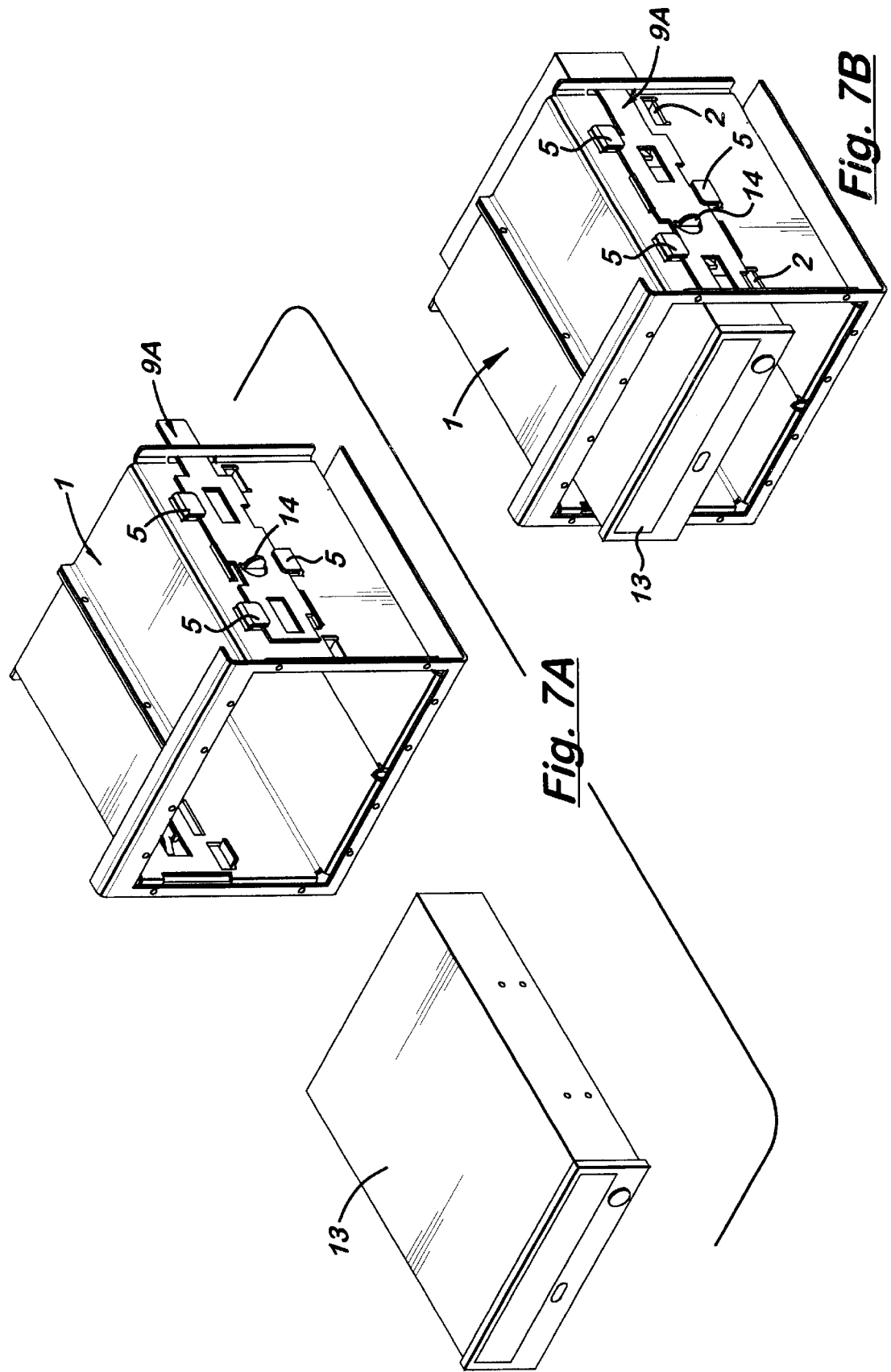

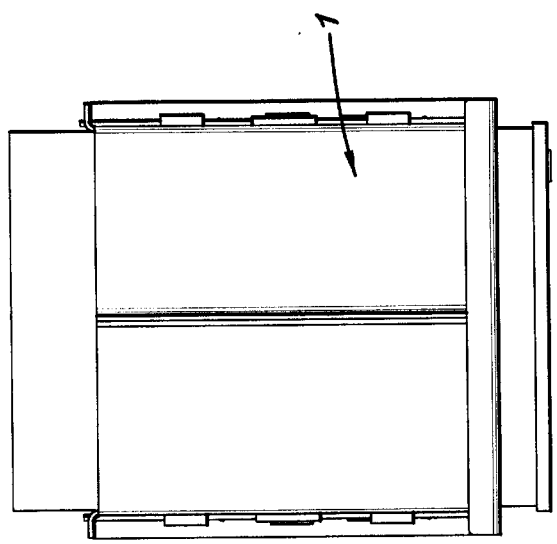
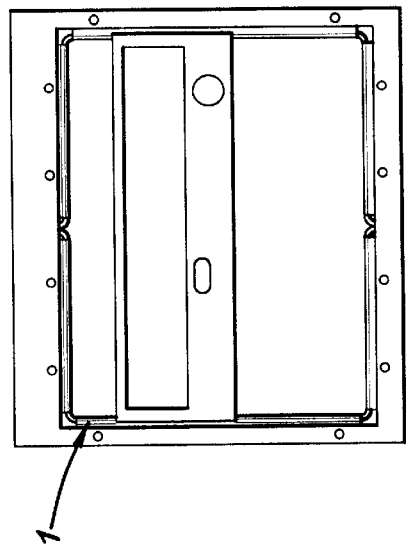
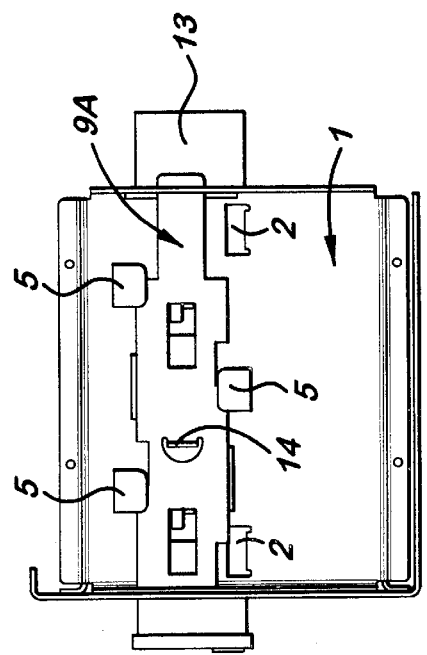

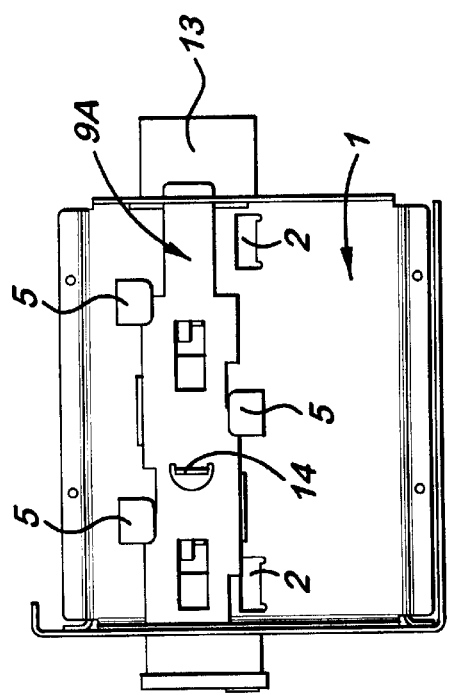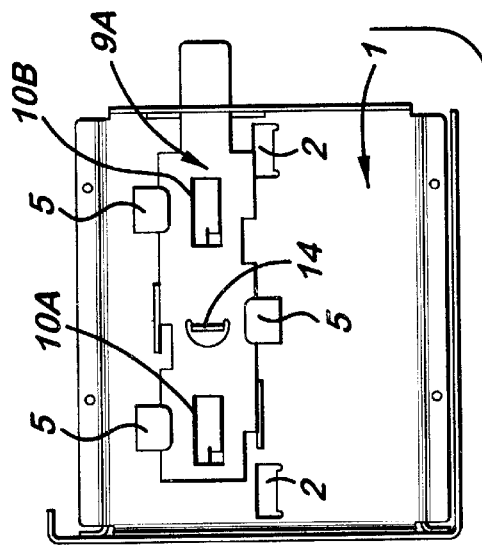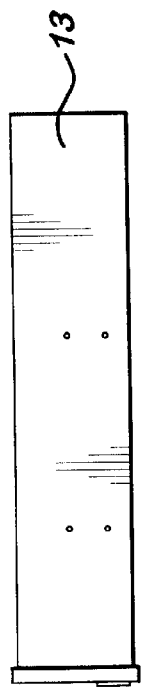

SCREWLESS COMPUTER DRIVE ASSEMBLY

This application claims benefit of provisional application Ser. No. 60/143,596 filed Jul. 13, 1999.

BACKGROUND OF INVENTION

1. Field of Invention

This invention pertains to the design of a screwless computer drive assembly. Specifically, in the present invention, a traditional drive mounting bracket or computer chassis is equipped with lock sliders which, when engaged, compress flexible flanges into standard screw holes located on the computer drive.

2. Description of Prior Art

Historically, computer drives such as CD-ROMs, floppy disks, DVD drives and the like, were attached to the chassis of a computer using standard micro sized machine screws. While such method of attachment was secure and precise, it required significant amounts of labor. Further, even in the most careful of environments, damaged resulted to the other internal components of the computer due to dropped screws and tool slippage.

The perceived solution in the computer industry to the problems inherent in the screw type drive attachment means has been to incorporate separate drive rails in the chassis design which allowed the computer drive being attached to slide into and then be locked into place. Typical of this type of attachment are those inventions disclosed in U.S. Pat. Nos. 5,806,949; 5,801,920; 5,734,557; 5,599,080; 5,595,501; and 5,262,923. This solution, however, did not eliminate the use of micro sized machine screws to attach the rails to the computer drives. Additionally, use of rails necessitated the need for some type of electrical conductive grounding path between the metal drive housing and the metal computer chassis as disclosed on page 1, line 64 of U.S. Pat. No. 5,734,557. Since the rail method of attachment did not eliminate the need for micro sized machine screws and in fact created a need for additional grounding, this method has not reduced the costs and complexity of the traditional screw type assembly.

OBJECTS OF THE INVENTION

It is the object of the present invention to provide a computer drive assembly that is both easy as well as inexpensive. Furthermore, it is an object of the present invention to provide a computer drive assembly that does not require the use of screws.

SUMMARY OF INVENTION

The present invention completely eliminates the needs for screws or assembly tools while installing a drive component into a computer chassis. In the present invention, flexible tabs which are flanged and pointed inward at the end are located along the sides of the drive mounting bracket or computer chassis at positions which correspond to the standardized screw holes in computer drives. To guide the computer drive into place, drive support flanges are also located on the drive mounting bracket or computer chassis.

The key to the screw less computer drive assembly are the lock sliders. Fashioned from rigid material such as that used in the drive mounting bracket or computer chassis, the lock sliders slide along the outside of the drive mounting bracket causing the flexible tabs to flex inward resulting in the ends of such tabs engaging the standardized screw holes in a typical computer drive. Once the ends of the flexible tabs have engaged the computer drive, such drive is locked securely in place.

BRIEF DESCRIPTION OF THE DRAWINGS

FIG. 2 is an isometric view showing a typical computer drive being inserted and attached to a typical drive mounting bracket using front access adapted lock sliders.

FIG. 7 is an isometric view showing a typical computer drive being inserted and attached to a typical drive mounting bracket using side access adapted lock sliders.

FIG. 8 shows a top view, right side view, front view and isometric view of a typical computer drive in its attached position using side access adapted lock sliders.

FIG. 9 shows two right side detailed views of the side access adapted lock sliders in both the unlocked and locked position.

DETAILED DESCRIPTION OF THE INVENTION

Figure 1:
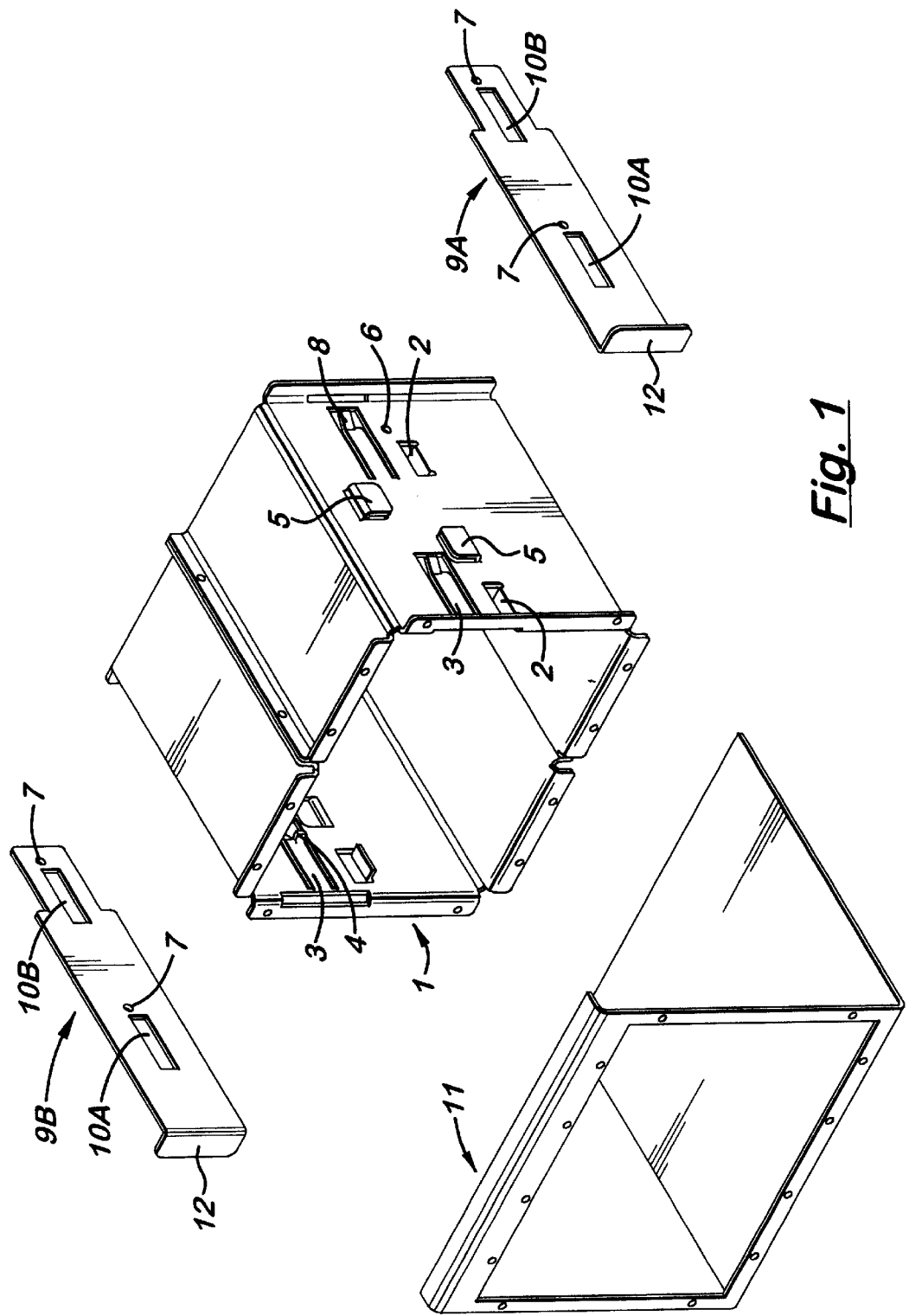
FIG. 1 is an exploded isometric view of the invention depicting the drive mounting bracket and lock sliders. The lock sliders of FIG. 1 have been adapted for front access.

For a detailed description of the preferred embodiment of the present invention, please refer to FIGS. 1–9 in which like components are given like numbers for easy reference. FIG. 1 depicts a typical drive mounting bracket (1). Shown in FIG. 1, located on the drive mounting bracket (1) are the drive support flanges (2), the flexible tabs (3), the lock barbs (4), the lock slider guides (5), locating dimples (6), the slider lift dimples (7), the flexible tab lift flanges (8), a right side and left side lock slider (9A and 9B), slider clearance slots (10A and 10B), and a drive mounting frame (11). The flexible tabs (3) are designed to compress inward towards the computer drive (13), forcing the lock barbs (4) into the standardized screw holes present on the computer drive (13) once the right and left lock sliders (9A and 9B) have been placed into position. Although the lock sliders (9A and 9B) shown on FIG. 1 have been adapted to include a front access flange (12), such sliders can also be adapted for side access as shown in FIG. 6, 7, 8 and 9. The access flanges (12) can be fashioned from any material such as plastic or metal and be of any shape so long as the shape is sufficient for grasping. Although the present invention utilizes pointed lock barbs (4), such barbs can be of any general size and shape so long as such size and shape allow the lock barbs to fit securely into the standardized screw holes present on the computer drive (13).

Figure 3A:
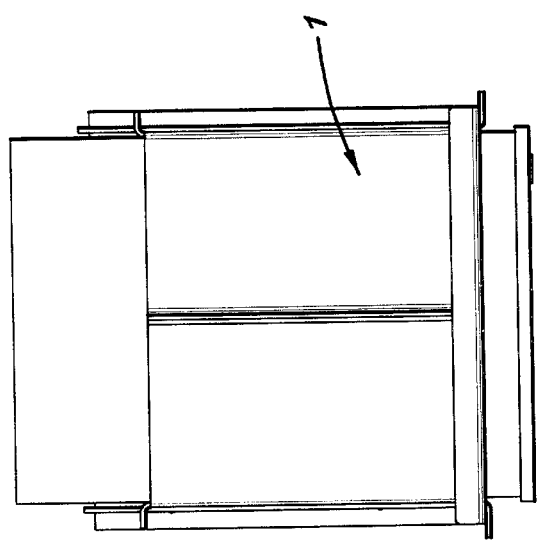
FIG. 3 shows a top view, right side view, front view and isometric view of a typical computer drive in its attached position using front access adapted lock sliders.
Figure 3B:
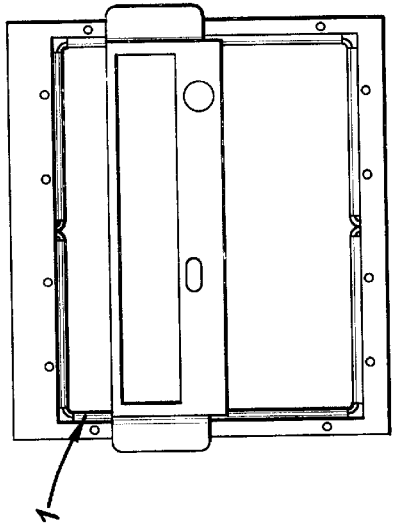
Figure 3C:
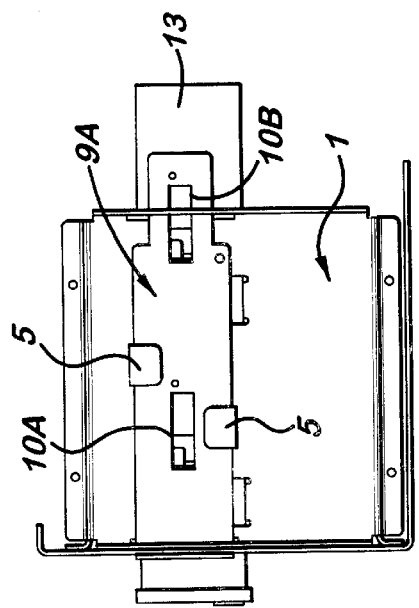
Figure 4A:
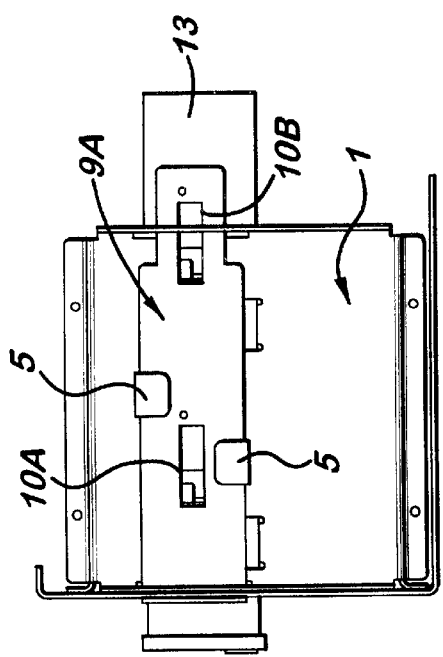
FIG. 4 shows two right side detailed views of the front access adapted lock sliders in both the unlocked and locked position.
Figure 4B:
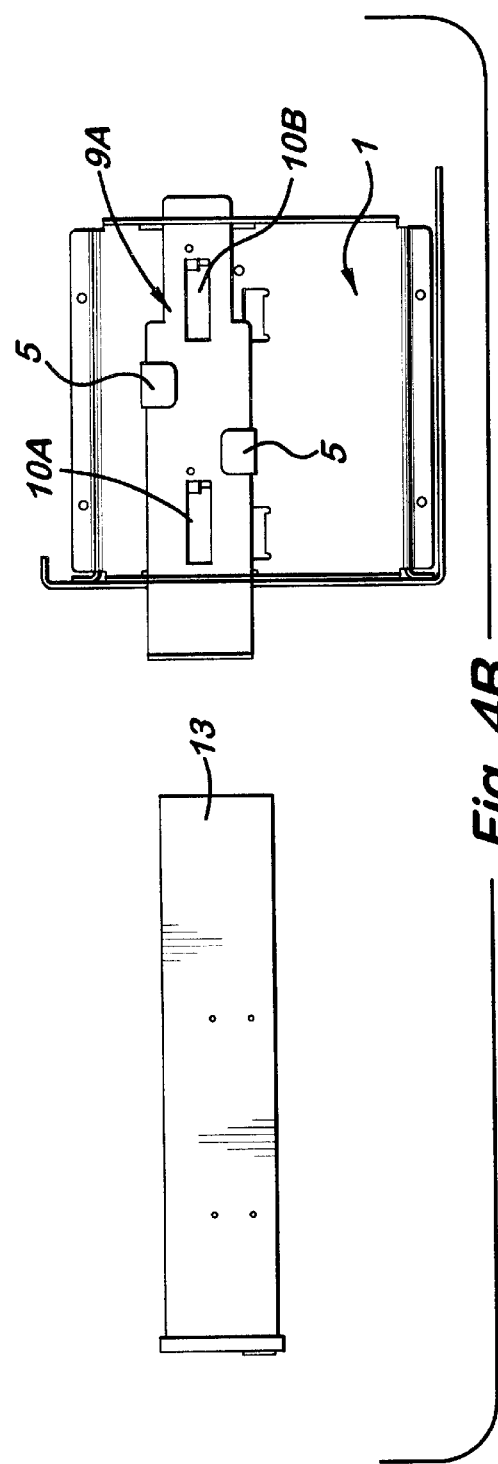
Figure 5B:
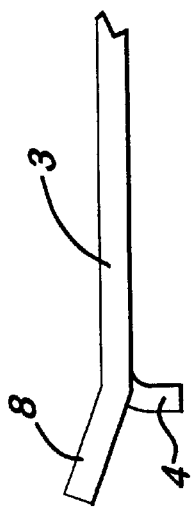
FIG. 5 shows multiple views of the flexible tabs on the drive mounting bracket.
Figure 5C:
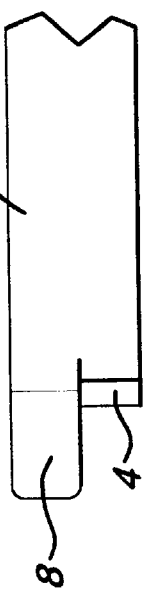
Figure 5D:
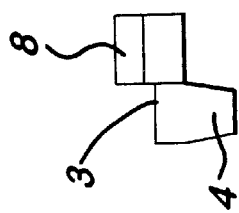
Figure 5A:
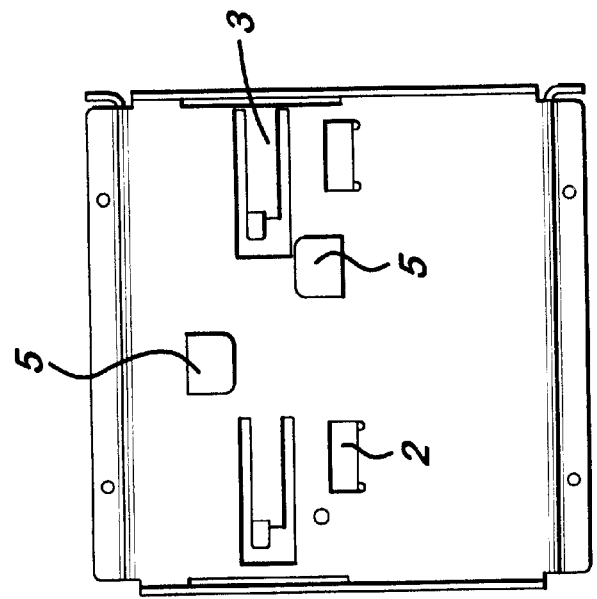
Figure 6:
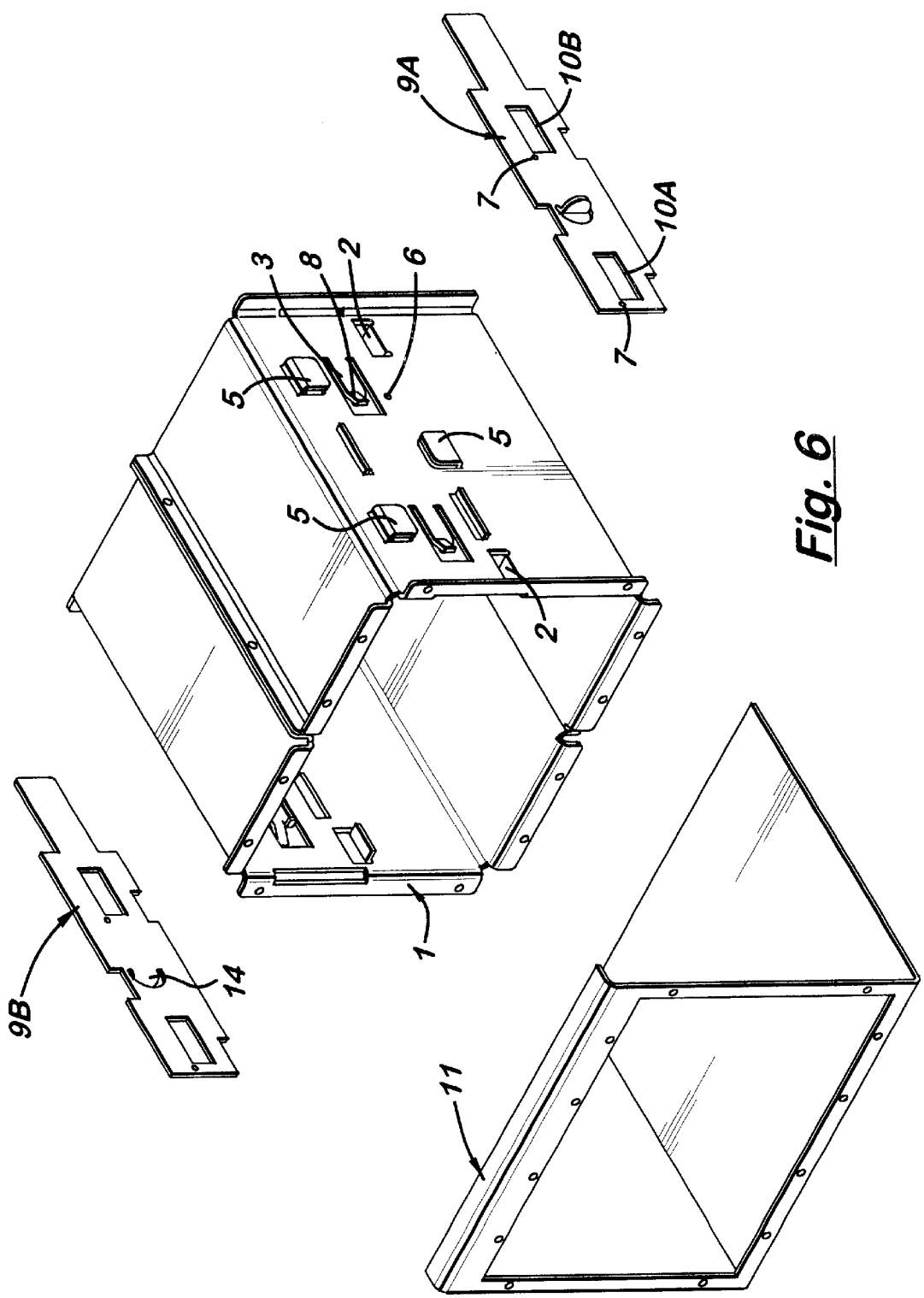
FIG. 6 is an exploded isometric view of the invention depicting the drive mounting bracket and lock sliders. The lock sliders of FIG. 6 have been adapted for side access.

As shown in FIGS. 2, 3 and 4, to install a typical computer drive (13), the lock sliders (9A and 9B)are positioned alongside the drive mounting bracket (1) using the lock slider guides (5) such that the slider clearance slots (10A and 10B) are centered over the flexible tabs (3). The position of the lock sliders as stated above is referred to as the "open position". The computer drive (13) is inserted into the drive mounting bracket using the drive support flanges (2) until the locating dimples (6) engage the drives rear mounting hole. Using the front access flange (12) located on the lock sliders (9a and 9B), the lock sliders are pushed towards the rear of the drive mounting bracket (l)until the flexible tabs (3) are compressed and the lock barbs (4) engage the computer drive's (13) standardized screw holes.

To remove a computer drive, the lock sliders (9A and 9B) are pulled towards the front of the drive mounting bracket (1) until the slider clearance slots (10A and 10B) are once again positioned over the flexible tabs (3). The slider lift dimples assist the flexible tabs (3) to retract during the unlocking process.

FIG. 5 depicts detailed views of the flexible tabs (3), lock barbs (4), and flexible tab lift flanges (8).

FIGS. 6–9, show the lock sliders (9A and 9B) adapted to include a side access flange (14).

While the Invention has been described with reference to certain preferred characteristics, those skilled in the art will appreciate that certain changes and modifications can be made without departing from the scope and spirit of the Invention as defined by the following claims. 6.

What is claimed is:

1. A screwless computer drive assembly, comprising:

a drive mounting bracket;

computer drive support flanges;

a right and left side lock slider;

a right and left side flexible tab; and a means for securing and positioning the right and left slider over and in contact with the flexible tabs;

The screw less computer drive assembly further comprising a drive mounting bracket equipped with protrusions or "dimples" coinciding with the standard screw holes in the computer drive which locate and position the computer drive within the drive mounting bracket.

2. The screw less computer drive assembly as claimed in claim 1 wherein the flexible tabs possess barbs which lock into the standard screw holes present on the computer drive.

3. The screw less computer drive assembly as in claim 2 wherein the lock sliders are equipped with front access flanges.

4. The screw less computer drive assembly as in claim 2 wherein the lock sliders are equipped with side access flanges.

5. The screw less computer drive assembly as in claim 2 wherein the lock sliders are equipped with lift protrusions or "dimples".

6. A method of assembling a computer drive comprising the steps of:

a. Sliding a computer drive along rails into a drive mounting bracket equipped with right and left side flexible tabs having lock barbs;

b. Positioning right and left lock sliders over and in contact with the flexible tabs in such a way as to compress the flexible tabs inward towards the computer drive, forcing the lock barbs into the standardized screw holes present on the computer drive.

* * * * *